June 7, 1927.
J. M. WEYDELL
1,631,662
OIL BURNER
Filed Oct. 23, 1922
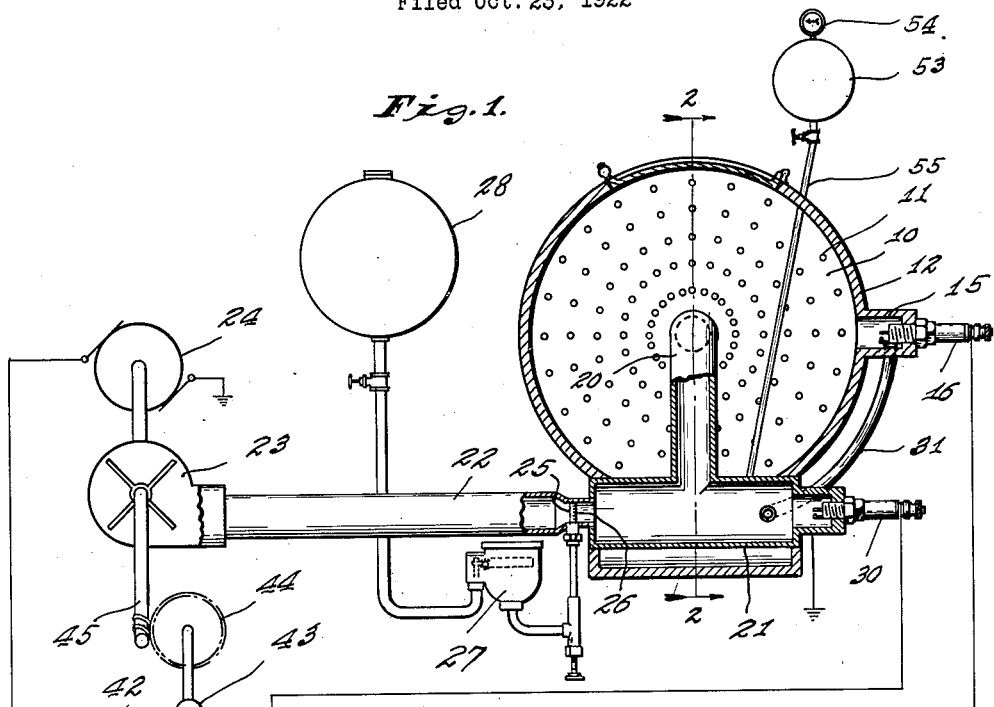
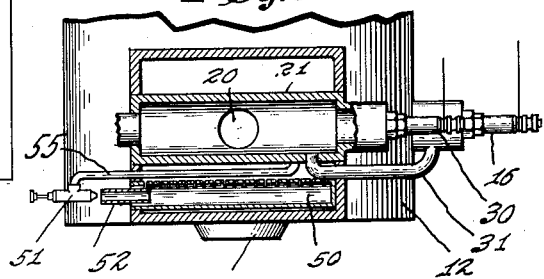
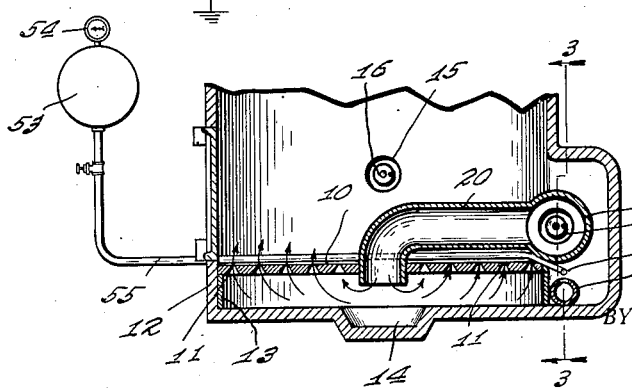
INVENTOR.
JARL M. WEYDELL,
BY
ATTORNEY.

Patented June 7, 1927.

1,631,662

UNITED STATES PATENT OFFICE.

JARL M. WEYDELL, OF INDIANAPOLIS, INDIANA, ASSIGNOR OF ONE-HALF TO EDWARD E. STOUT, OF INDIANAPOLIS, INDIANA.

OIL BURNER.

Application filed October 23, 1922. Serial No. 596,234.

It is the object of my invention to produce an oil burner, capable of burning kerosene and other low-grade fuels, which burner is capable of igniting the kerosene or other fuel by an ordinary spark plug whether hot or cold, will relight the flame if for any reason it goes out temporarily and will do this without undue wear on the spark-plug or on the vibrator points of the spark coil, and will prepare the fuel for burning by both atomization and vaporization as well as by preheating both when the main burner is in operation and when it is not.

The accompanying drawing illustrates my invention: Fig. 1 is a horizontal section through a burner embodying my invention, showing the air-supply and fuel-supplies and the electric connections diagrammatically; Fig. 2 is a vertical section on the line 2—2 of Fig. 1; Fig. 3 is a vertical section on the line 3—3 of Fig. 2; and Fig. 4 an enlarged view of the spraying nozzle.

The burner has a burner plate 10 with any suitable gas-emitting openings 11 therein. This plate is mounted in a cup-shaped shell 12, and is suitably spaced upward from the bottom of said shell, as by a spacing ring 13; and preferably the bottom of the shell has a central depression 14. The shell 12 may extend upward any convenient distance above the burner plate 10. In the side wall of the shell 12, above the burner plate 10, is an inwardly opening cup-shaped recess 15, in which are the electrodes of a suitable spark-plug 16; which is sufficiently far away from the main burner so that it will not be destroyed by the flames therefrom, and as hereinafter explained, has combustible mixture supplied to it independently of the main burner.

A mixture-discharge pipe 20, shown as separate from the burner plate 10 though not essentially so, extends horizontally over the burner plate 10, from a point near the edge thereof to about the middle thereof as shown; and is turned down conveniently at about the middle of the burner plate, to discharge downward through such burner plate into the space below it. This downward discharge is directly over the depression 14 in the bottom of the shell 12. This mixture discharge pipe leads laterally from a mixing chamber 21, located at one side of the burner shell 12 but preferably within a lateral extension of it. This mixing chamber 21 is in the form of a cylinder, from about the middle of which the mixture-discharge pipe 21 opens substantially at right angles. At one end, the mixing chamber 21 is supplied with a blast of air from a tube 22, supplied in any convenient way, as from a blower 23 driven by an electric motor 24. Near its discharge end the air tube 22 has extending across it a fuel nozzle 25, which as shown is a tube provided with a number of transverse saw-slots 26 extending about halfway through it; these saw-slots open in the direction toward which air is flowing. This fuel nozzle 25 is preferably mounted quite close to the mixing chamber 21. Fuel is preferably supplied to the fuel nozzle by aspiration from a float bowl 27, the tube 22 preferably being slightly smaller at the fuel nozzle to provide the increased air velocity for producing the desired aspiration. The liquid level in the float-bowl is slightly lower than the fuel nozzle; and the floatbowl is supplied from any suitable source especially by gravity, as from a higher supply tank 28, as is indicated diagrammatically in Fig. 1. This fuel for the nozzle 25 may be some low-grade fuel, such as kerosene.

The mixture of air and fuel discharged from the tube 22 into one end of the mixing chamber 21 is projected the whole length of such chamber and thrown against the other end thereof. At this last-named end of the mixing chamber 21 is a second spark-plug 30, the electrodes of which are in the cup formed by the end of the mixing chamber. This cup is shown as slightly smaller in diameter than the body of the mixing chamber, which is the structure I prefer for the larger sizes of burners; but this difference in diameter between the cup and the mixing chamber is not essential.

The mixture of air and fuel discharged from the pipe 22 is thus thrown forcibly into the cup containing the spark-plug 30. I have found that because of this arrangement, whether or not there is a surrounding tube as shown between the nozzle and the cup, it is perfectly possible to ignite this mixture by the spark-plug 30 without any heating of the mixture and without any special means for increasing the richness of the mixture, such as has originally been thought essential for the ignition of kerosene or a lower-grade oil.

There is a by-pass tube 31 which leads to the cup 15 from a suitable point in the mixing chamber 21. The tube 31 preferably opens laterally out of the mixing chamber 21, at a point some distance from the ignition cup at the right-hand end thereof (Figs. 1 and 3); and supplies combustible mixture to the recess 15 and spark plug 16 independently of the main burner, as already stated. The fluid flow through the pipe 31 continues through the recess 15 out into the burner shell 12 and above the burner plate 10, and so carries the flame produced in the recess 15 by the spark-plug 16 out over the main burner plate 10 to ignite the combustible mixture there.

The two spark plugs 16 and 30 are connected respectively to the secondaries of two vibrator spark-coils 35 and 36. These spark coils may be of the usual construction, each with its make-and-break vibrator 37. These spark coils are controlled by a double-throw switch 38, which has one contact button 39 on one side and two contact buttons 40 and 41 on the other side. The contact buttons 39 and 40 are connected together, and to one side of the primary circuit of the spark coil 36, through its vibrator 37. These two contact buttons 39 and 40 are also connected to one side of the motor 24, the other side of which is grounded. The contact button 41 is connected to one side of the primary circuit of the other spark coil 35, by way of its vibrator 37. The remaining terminals of the two spark-coil primaries are connected together and to one side of a spring switch 42 which springs to open position but is closed periodically by a cam 43 driven slowly, as through a worm gearing 44, from the common shaft 45 of the blower 23 and electric motor 24.

In operation, the switch 38 is thrown to the left for starting, thus starting the motor 24 in operation, and supplying showers of sparks intermittently at both the spark plugs 16 and 30, the intermittency of the sparking being controlled by the cam 43. The electric motor 24 drives the fan or blower 23, which blows air through the tube 22, past the nozzle 25, and into one end of the mixing chamber 21. The stream of air past the nozzle 25 draws out the kerosene or other fuel from the bowl 27, and sprays it with the air into one end of the mixing chamber 21. This mixture of air and fuel is thrown forcible the whole length of the mixing chamber 21 into the cup containing the spark plug 30; and I find that this mixture promptly ignites from the spark at such spark plug, in spite of the low grade of the fuel. The burning mixture is discharged from the mixing chamber through the discharge pipe 20, which produces considerable turbulence in the mixing chamber because this discharge pipe 20 communicates with the chamber at an intermediate point; and this burning mixture is discharged downward below the burner plate 10, and up through the holes 11. At this time, because the burner plate is cold, there is no flame above the burner plate; but in a comparatively short time the burner plate 10, the mixture-discharge pipe 20, and the mixing chamber 21 become heated, When these are sufficiently hot, the switch 38 is thrown from its left-hand position to its right-hand position. This cuts out the coil 35, and therefore cuts out the spark plug 30; but it keeps the spark plug 16 and the motor 24 in operation. Shortly after this switch is thrown, I find that for some reason, apparently because the burning action within the mixing chamber is wholly erratic, the flame is extinguished within the mixing chamber 21, the mixture-discharge pipe 20, and the space below the burner plate 10. Almost as soon as this extinguishing takes place below the burner plate 10, so that unburned gases are emitted through the holes 11, a flame is ignited above the burner plate 10. This ignition above the burner plate 10 is produced by the spark-plug 16, which is supplied with a hot and readily ignitible mixture of fuel and air from the mixing chamber 21 through the by-pass tube 31; and the flame from this gas ignited in the cup or recess 15 ignites the mixture discharged through the holes 11 of the burner plate 10. The mixture which is thus ignited is heated by the now hot mixing chamber 21 and mixture-discharge pipe 20; and these are maintained hot for the continued supply of mixture because the mixture-discharge pipe 20 is located in the flame above the burner plate 10.

If for any reason, the flame above the burner plate 10 goes out, it is almost immediately re-lighted from the spark-plug 16. There are intermittent showers of sparks at this spark plug throughout the operation, whenever the switch 42 is closed by its cam 43; but because these showers of sparks occur only intermittently, there is a saving of energy, a saving of wear on the electrodes of the spark plug, and a saving of wear and a maintenance of the coolness of the contacts of the vibrator 37 of the spark coil 36.

The mixture which is burned above the burner plate 10 is doubly prepared for burning. It is atomized by the blast of air, as such air blows past the nozzle 25. It is thoroughly mixed with this air in the mixing chamber 21, and while it is in this mixing chamber 21 and is traveling through the mixture-discharge pipe 20 it is effectively vaporized by the heat of these parts. Thus the fuel is both atomized and vaporized before it is burned. However, if any liquid fuel is deposited in the shell 12 below the burner plate 10, it collects in the depression 14, so that it is held in position to be played on directly by the downward blast of mixture from the mixture-discharge pipe 20 and will thus readily be vaporized when the burner is in operation.

The device as so far described operates very effectively both to maintain the burner in operation, and also to burn efficiently when a low-grade fuel such as kerosene is used. This ignition arrangement will be used for initial ignition, after the burner has been out of operation for a considerable time. However, in case the burner is to be out of operation for only a short time, or even for a longer time, it may be desirable to produce ignition without the delay which always follows when the burner has been allowed to become cold, and also without the use of the spark-plug 30; and in addition, it may be desired not to permit the burner and the boiler heated therefrom to become cold, but to keep steam constantly available.

To accomplish this, I preferably provide a preheating arrangement, usually in addition to the initial ignition mechanism provided by the spark-plug 30 and its associated parts, though also capable of use even when the spark-plug 30, or both spark-plugs 30 and 16, are not provided. This preheater consists of a horizontal tube 50 located below the mixing chamber 21, as is clear from Figs. 2 and 3. This pre-heating tube 50 preferably extends the whole length of the mixing chamber 21, and in its upper part is provided with a series of transverse slots to provide burner holes. The preheating tube 50 is preferably supplied with a higher-grade fuel, such as gasoline, from a mixing valve 51, which injects an adjustable quantity of such fuel through an air-admitting tube 52 into the preheating tube 50. The mixing valve 51 is supplied from a tank 53; which is preferably a closed tank with air pressure within it and with a suitable air-pressure gauge 54 associated with it, so that the fuel will be supplied by air under pressure. The fuel from the tank 53 passes by a pipe 55 to the mixing valve 51. This pipe 55 has part of its length located over the burner 10, to be heated thereby, and another part of its length located directly over the preheating tube 50 between the preheating tube and the mixing chamber 21. Thus the fuel supplied to the preheating tube 50 will be heated both by the flames from the preheater and also by the flames from the main burner plate 10; and these flames from the preheater 50 supply the heat to keep the mixing chamber 21 hot and to maintain the steam in the associated boiler under conditions of no-consumption. Then, when the supply of fuel for the main burner is discounted, by the opening of the switch 38, steam is still maintained, and in addition, the mixing chamber 21 is maintained hot, so that to start up the main burner 10 it is only necessary to throw the switch 38 in to contact with the button 39, without the necessity for any preliminary burning within the mixing chamber 21.

I claim as my invention:

1. In combination, a cup, a spark-plug having its electrodes within said cup, an air tube having its discharge end in position to blow air from a distance into the mouth of said cup, means for producing a blast of air through said air tube, and a fuel nozzle in position to discharge fuel into said air blast.

2. In combination, a cup, a spark-plug having its electrodes within said cup, an air tube having its discharge end in position to blow air from a distance into the mouth of said cup, means for producing a blast of air through said air tube, a fuel nozzle mounted in said air tube near its discharge end, and a source of fuel supply for said fuel nozzle.

3. In combination, a cup, a spark-plug having its electrodes within said cup, an air tube having its discharge end in position to blow air from a distance into the mouth of said cup, means for producing a blast of air through said air tube, a fuel nozzle mounted in said air tube, and a source of fuel supply for said fuel nozzle.

4. In combination, a cup, a spark-plug having its electrodes within said cup, an air tube having its discharge end in position to blow air from a distance into the mouth of said cup, means for producing a blast of air through said air tube, an aspirating fuel nozzle mounted in said air tube, and a source of fuel supply for said fuel nozzle, said source of fuel supply being lower than said nozzle.

5. In combination, a mixing chamber closed at one end, a spark-plug having its electrodes located within said mixing chamber near said closed end, a mixture-discharge tube communicating with said mixing chamber at an intermediate point of the latter, and means for blowing a stream of mixed air and fuel into the opposite end of the mixing chamber from that at which the spark-plug is located.

6. In combination, a mixing chamber closed at one end, a spark-plug having its electrodes located within said mixing chamber near said closed end, a mixture-discharge tube communicating with said mixing chamber at an intermediate point of the latter, and means for blowing a stream of mixed air and fuel into the opposite end of the mixing chamber from that at which the spark-plug is located, a burner shell, said mixture-discharge tube extending across said burner shell and discharging downward.

7. In combination, a mixing chamber closed at one end, a spark-plug having its electrodes located within said mixing chamber near said closed end, a mixture-discharge tube communicating with said mixing chamber at an intermediate point of the latter, means for blowing a stream of mixed air and fuel into the opposite end of the mixing chamber from that at which the spark-plug is located, a burner shell, said mixture-discharge tube extending across said burner shell and discharging downward, said shell having a recess in its side wall above the burner plate, and a spark-plug having its electrodes located in said recess, and a tube connecting said recess to said mixing chamber so that it receives explosive mixture therefrom.

8. In combination, a mixing chamber closed at one end, a spark-plug having its electrodes located within said mixing chamber near said closed end, a mixture-discharge tube communicating with said mixing chamber at an intermediate point of the latter, means for blowing a stream of mixed air and fuel into the opposite end of the mixing chamber from that at which the spark-plug is located, a burner shell, said mixture-discharge tube extending across said burner shell and discharging downward, said shell having a recess in its side wall above the burner plate, a spark-plug having its electrodes located in said recess, a tube connecting said recess to said mixing chamber so that it receives explosive mixture therefrom, and means for intermittently producing sparking at said spark-plugs.

9. In combination, a mixing chamber closed at one end, a spark-plug having its electrodes located within said mixing chamber near said closed end, a mixture-discharge tube communicating with said mixing chamber at an intermediate point of the latter, means for blowing a stream of mixed air and fuel into the opposite end of the mixing chamber from that at which the spark-plug is located, a burner shell, said mixture-discharge tube extending across said burner shell and discharging downward, said shell having a recess in its side wall above the burner plate, a spark-plug having its electrodes located in said recess, a tube connecting said recess to said mixing chamber so that it receives explosive mixture therefrom, means for intermittently producing sparking at said spark-plugs, and a double-throw switch which when in one position permits energization of one spark-plug and when in another position permits energization of the other spark-plug and cuts out the first spark-plug.

10. In combination, a burner shell, a mixture-discharge tube extending across said burner shell and discharging downward so that said mixture-discharge tube will be heated by flames in the burner shell, a mixing chamber from an intermediate point of which said mixture-discharge tube receives its mixture supply, means for supplying air and fuel to said mixing chamber, a spark-plug for igniting said mixture in said mixing chamber, a spark-plug for igniting the mixture in said burner shell above said burner plate, and means for intermittently producing sparking at said spark-plugs.

11. In combination, a burner shell, a mixture-discharge tube extending across said burner shell and discharging downward so that said mixture-discharge tube will be heated by flames in the burner shell, means for supplying air and fuel to said mixture-discharge tube, a spark-plug for producing ignition of said mixture before it leaves said mixture discharge tube, and a spark-plug for producing ignition of said mixture in said burner shell.

12. In combination, a burner shell, a mixture-discharge tube extending across said burner shell and discharging downward so that said mixture-discharge tube will be heated by flame in the burner shell, means for supplying air and fuel to said mixture-discharge tube, a spark-plug for igniting said mixture before it leaves said mixture-discharge tube, a spark-plug for igniting said mixture in said burner shell, and means for intermittently causing sparking at said second spark-plug.

13. In combination, a burner shell, a mixture-discharge tube extending across said burner shell and discharging downward so that said mixture-discharge tube will be heated by flames in the burner shell, means for supplying air and fuel to said mixture-discharge tube, a spark-plug for igniting said mixture before it leaves said mixture-discharge tube, a spark-plug for igniting said mixture in said burner shell, means for intermittently causing sparking at said second spark plug, and means for cutting out said first spark plug while permitting said second spark plug to operate.

14. In combination, a burner shell, a mixture-discharge tube extending across said burner shell and discharging downward so that said mixture-discharge tube will be heated by flames in the burner shell, a mixing chamber from an intermediate point of which said mixture-discharge tube receives its mixture supply, and means for atomizing fuel into said mixing chamber by a forced draft of air into the mixing chamber.

15. In combination, a burner shell, a mixture-discharge tube extending across said burner shell and discharging downward so that said mixture-discharge tube will be heated by flames in the burner shell, means for supplying a mixture of air and fuel to said mixture-discharge tube, two spark plugs for igniting said mixture respectively before it leaves said mixture-discharge tube and after it has passed into the burner shell, two spark coils for supplying said spark-plugs respectively, and means operating while the burner is in operation for intermittently causing sparking at the second spark-plug.

16. In combination, a burner, a mixing chamber from which a mixture of air and fuel is discharged into said burner, means for blowing a stream of mixed air and fuel into said mixing chamber, a spark-plug for igniting the mixture of air and fuel, the electrodes of said spark-plug being located in a lateral recess of the burner, and means for intermittently causing sparking at said spark-plug.

17. In combination, a burner, a mixing chamber from which a mixture of air and fuel is discharged into said burner, means for blowing a stream of mixed air and fuel into said mixing chamber, a spark-plug for igniting the mixture of air and fuel, means for intermittently causing sparking at said spark-plug and a preheater for heating said mixing chamber.

18. In combination, a burner, a mixing chamber from which a mixture of air and fuel is discharged into said burner, means for blowing a stream of mixed air and fuel into said mixing chamber, and a preheater for heating said mixing chamber, and separate sources of fuel supply for said mixing chamber and for said preheater respectively so that the preheater may be supplied with a different grade of fuel from the mixing chamber.

19. In combination, a burner having a shell, means for supplying combustible mixture to said burner shell, said shell having a lateral recess, a spark-plug having electrodes located in said lateral recess, and means for causing intermittent sparking at said spark-plug while the burner is in operation.

In witness whereof, I have hereunto set my hand at Indianapolis, Indiana, this seventeenth day of October, A. D. one thousand nine hundred and twenty two.

JARL M. WEYDELL.